United States Patent
Sayenko et al.

(10) Patent No.: US 12,495,370 B2
(45) Date of Patent: Dec. 9, 2025

(54) METHOD FOR MULTIPLE POWER CLASS SUPPORT

(71) Applicant: Apple Inc., Cupertino, CA (US)

(72) Inventors: Alexander Sayenko, Munich (DE); Daniel Popp, Munich (DE); Anatoliy S Ioffe, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 17/976,463

(22) Filed: Oct. 28, 2022

(65) Prior Publication Data
US 2023/0319736 A1 Oct. 5, 2023

Related U.S. Application Data

(60) Provisional application No. 63/319,004, filed on Mar. 11, 2022.

(51) Int. Cl.
*H04W 52/36* (2009.01)
*H04W 52/28* (2009.01)
(Continued)

(52) U.S. Cl.
CPC ......... *H04W 52/367* (2013.01); *H04W 52/28* (2013.01); *H04W 52/52* (2013.01); *H04W 72/0453* (2013.01)

(58) Field of Classification Search
CPC ... H04W 52/36; H04W 52/367; H04W 52/52; H04W 53/28; H04W 72/04; H04W 72/0453; H04L 1/0026; H04L 1/0029
See application file for complete search history.

(56) References Cited

U.S. PATENT DOCUMENTS 5,734,678 A * 3/1998 Paneth ............... H04L 1/06
375/240
7,471,738 B2 * 12/2008 Chan ............... H03G 3/3042
375/297
(Continued)

FOREIGN PATENT DOCUMENTS

WO WO-2014088792 A1 * 6/2014 ......... H04W 52/146
WO 20190158461 A1 8/2019

OTHER PUBLICATIONS

Qualcomm Inc., "Revised WID on NR-based Access to Unlicensed Spectrum," 3GPP TSG RAN Meeting #86, Sitges, Spain, Dec. 9-12, 2019, RP-1912926, pp. 1-8.
(Continued)

*Primary Examiner* — Hai V Nguyen
(74) *Attorney, Agent, or Firm* — FLETCHER YODER PC (57) ABSTRACT

Embodiments herein provide various apparatuses and techniques that indicate multiple power classes that user equipment may support to a network. The user equipment may support at least a lower power class (e.g., having a lower maximum transmission power) and a higher power class (e.g., having a higher maximum transmission power) to the network. The user equipment may send indications to the network that it supports both the lower power class and the higher power class. If the network/user equipment are in a geographical region associated with regulations limiting transmission power to the lower maximum transmission power, then the network may configure a transmission power characteristic based on the lower power class. If the network/user equipment are in a geographical region associated with regulations limiting transmission power to the higher maximum transmission power, then the network may configure the transmission power characteristic based on the higher power class.

20 Claims, 4 Drawing Sheets

(51) Int. Cl.
*H04W 52/52* (2009.01)
*H04W 72/0453* (2023.01)

(56) References Cited

U.S. PATENT DOCUMENTS

| | | | | |
|---|---|---|---|---|
| 8,130,128 B2* | 3/2012 | Alderson | ............... | H03F 3/217 |
| | | | | 375/243 |
| 8,452,321 B2* | 5/2013 | Fodor | ............... | H04W 52/367 |
| | | | | 455/343.1 |
| 8,599,963 B2* | 12/2013 | Chan | ............... | H03G 3/3042 |
| | | | | 375/297 |
| 8,768,397 B2* | 7/2014 | Imamura | ............ | H04W 52/367 |
| | | | | 455/500 |
| 8,886,247 B1* | 11/2014 | Price | ............... | H04B 1/3838 |
| | | | | 455/575.4 |
| 9,363,765 B2* | 6/2016 | Kazmi | ............... | H04W 52/367 |
| 9,622,190 B2* | 4/2017 | Goedken | ............ | H04W 52/367 |
| 9,699,743 B2* | 7/2017 | Kazmi | ............... | H04W 52/18 |
| 11,503,552 B2* | 11/2022 | Bergström | ......... | H04W 52/367 |
| 11,716,696 B2* | 8/2023 | Takahashi | ......... | H04W 52/367 |
| | | | | 455/522 |
| 11,997,617 B2* | 5/2024 | Adjakple | ............. | H04L 5/0092 |
| 12,047,042 B2* | 7/2024 | Ghosh | ............... | H03L 7/07 |
| 12,074,687 B2* | 8/2024 | Al-Mufti | ............. | H04W 16/14 |
| 2004/0208260 A1* | 10/2004 | Chan | ............... | H04W 52/52 |
| | | | | 375/297 |
| 2009/0088083 A1 | 4/2009 | Fujii et al. | | |
| 2009/0243688 A1* | 10/2009 | Khoury | ............... | H03F 3/217 |
| | | | | 327/231 |
| 2011/0081934 A1* | 4/2011 | Imamura | ............ | H04W 52/146 |
| | | | | 455/522 |
| 2011/0130105 A1* | 6/2011 | Chan | ............... | H03F 3/24 |
| | | | | 455/127.2 |
| 2011/0237289 A1* | 9/2011 | Fodor | ............... | H04W 52/367 |
| | | | | 455/522 |
| 2011/0241919 A1* | 10/2011 | Alderson | ............ | H03K 3/84 |
| | | | | 341/143 |
| 2012/0087441 A1* | 4/2012 | Chan | ............... | H03G 3/3042 |
| | | | | 375/297 |
| 2013/0165132 A1* | 6/2013 | Goedken | ............ | H04W 52/243 |
| | | | | 455/450 |
| 2013/0197401 A1* | 8/2013 | Sato | ............... | A61N 7/00 |
| | | | | 601/2 |
| 2013/0273863 A1* | 10/2013 | Chan | ............... | H04B 1/0475 |
| | | | | 455/127.2 |
| 2015/0011236 A1* | 1/2015 | Kazmi | ............... | H04W 52/365 |
| | | | | 455/456.1 |
| 2015/0092670 A1* | 4/2015 | Makhlouf | ......... | H04W 52/265 |
| | | | | 370/329 |
| 2015/0111608 A1* | 4/2015 | Kazmi | ............... | H04W 52/367 |
| | | | | 455/522 |
| 2016/0270008 A1* | 9/2016 | Kazmi | ............... | H04W 52/367 |
| 2018/0249420 A1* | 8/2018 | Lim | ............... | H04W 72/0446 |
| 2019/0223119 A1* | 7/2019 | Takahashi | ......... | H04W 52/367 |
| 2020/0154361 A1* | 5/2020 | Lim | ............... | H04W 52/14 |
| 2020/0288412 A1* | 9/2020 | Ajdakple | ............ | H04W 52/365 |
| 2021/0092690 A1* | 3/2021 | Bergström | ......... | H04W 52/34 |
| 2023/0126040 A1* | 4/2023 | Poulin | ............... | H03F 3/195 |
| | | | | 330/296 |
| 2023/0170855 A1* | 6/2023 | Ghosh | ............... | H03L 7/0816 |
| 2023/0217195 A1* | 7/2023 | Poltorak | ............. | H04R 25/609 |
| | | | | 381/315 |
| 2023/0319736 A1* | 10/2023 | Sayenko | ............ | H04W 52/52 |
| | | | | 455/522 |

OTHER PUBLICATIONS

Nokia, "WID on Introduction of lower 6GHz NR unlicensed operation for Europe," 3GPP TSG RAN Meeting #90e, Dec. 7-11, 2020, RP-202592, pp. 1-4.

Apple Inc., "Revised WID for Introduction of operation in full unlicensed band 5925-7125MHz," 3GPP TSG-RAN Meeting #93e, Sep. 13-17, 2021, RP-212302, pp. 1-5.

3GPP, "3rd Generation Partnership Project; Technical Specification Group Radio Access Network; Feasibility Study on 6 GHz for LTE and NR in Licensed and Unlicensed Operations (Release 17)," 3GPP TR 37.890 volume 13, Sep. 2021, pp. 1-31.

3rd Generation Partnership Project; Technical Specification Group Radio Access Netowrk; NR; User Equipment (UE) radio transmission and reception; Part 1: Range 1 Standalone (Release 17); 3GPP Standard; Technical Specification; 3GPP TS 38.101-1, 3rd Generation Partnership Project (3GPP), vol. RAN WG4, No. V17.4.0, Jan. 12, 2022; pp. 214-545; (XP05211858575) [retrieved from the internet: https://ftp.3gpp.org/specs/archive/38_series/38.101-1/38101-1-h40.zip 38101-1-h40_s06-XX.docx].

International Search Report & Written Opnioin for PCT Application No. PCT/US2023/014328 dated Jun. 19, 2023; 12 pgs.

* cited by examiner

METHOD FOR MULTIPLE POWER CLASS SUPPORT

CROSS-REFERENCE PARAGRAPH

This application claims priority to U.S. Provisional Application No. 63/319,004, filed Mar. 11, 2022, entitled "METHOD FOR MULTIPLE POWER CLASS SUPPORT," which is incorporated by reference herein in its entirety for all purposes.

BACKGROUND

The present disclosure relates generally to wireless communication, and more specifically to transmission power of user equipment (e.g., mobile wireless communication devices).

Regulatory requirements (e.g., as promulgated in the United States by the Federal Communications Commission (FCC)) limit transmission power of user equipment based on a frequency at which the user equipment sends wireless signals. For example, the FCC may limit user equipment operating within a specified frequency to a transmission power (referred as a maximum transmission power) of 23 decibel milliwatts (dBm).

User equipment may indicate a power class to a network (e.g. a cellular network) corresponding to its maximum transmission power. The network may then configure transmission power characteristic of the user equipment based on the power class. In some cases, user equipment may be capable of operating in multiple power classes, each having a different maximum transmission power. For example, the user equipment may operate in a higher power class having a higher maximum transmission power, and a lower power class having a lower maximum transmission power.

However, the user equipment may only indicate one power class to the network. As such, the user equipment may indicate its higher power class (e.g., associated with its higher transmission power). In cases where the user equipment is operating in a geographical region where a regulatory body requires the user equipment to operate using the lower maximum transmission power, the network configures the user equipment with the lower maximum transmission power. However, the network may only assume that the user equipment is operating using the higher power class, as that was what was indicated by the user equipment, even though the user equipment may use its lower power class. As such, the network may configure the user equipment based on the higher power class rather than the lower power class (e.g., to operate based on a transmission power characteristic associated with higher power class rather than one associated with the lower power class), which may result in operating and transmission inefficiencies.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes a transmitter having multiple power amplifiers, a receiver that receives an indication of an emission limit, and processing circuitry. The processing circuitry transmits, using the transmitter, an indication of multiple power classes supported by the power amplifiers, adjusts transmission power of the transmitter based on the emission limit, and transmits, using the transmitter, a radio frequency signal using the transmission power.

In another embodiment, a base station, includes a receiver that receives an indication of multiple power classes supported by user equipment, a transmitter that transmits an indication of an emission limit to the user equipment, and processing circuitry. The processing circuitry operates the user equipment using a first power class of the multiple power classes or a second power class of the multiple power classes based on the emission limit, a first maximum transmission power associated with the first power class, and a second maximum transmission power associated with the second power class.

In yet another embodiment, a method includes receiving, at a receiver of a base station, an indication of a higher power class and a lower power class supported by user equipment. The method also includes receiving an emission limit for a geographical region at which the base station or the user equipment is located. The method further includes operating, via processing circuitry, the user equipment using the higher power class or the lower power class based on the emission limit.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

The present disclosure relates generally to wireless communication, and more specifically to transmission power of user equipment (e.g., mobile wireless communication devices). In particular, embodiments herein provide various apparatuses and techniques that indicate multiple power classes that user equipment may support to a network (e.g. a cellular network) corresponding to its maximum transmission power. For example, the user equipment may support at least a lower power class (e.g., having a lower maximum transmission power) and a higher power class (e.g., having a higher maximum transmission power) to the network. Accordingly, the user equipment may send indications to the network that it supports both the lower power class and the higher power class.

As a result, if the network and/or user equipment are in a geographical region associated with regulations limiting user equipment transmission power to the lower maximum transmission power, then the network may configure a transmission power characteristic (e.g., a power reduction of the user equipment transmission power) based on the lower power class. On the other hand, if the network and/or user equipment are in a geographical region associated with regulations limiting user equipment transmission power to the higher maximum transmission power, then the network may configure the transmission power characteristic based on the higher power class. This may enable the user equipment to use a transmission configuration (e.g., of power amplifiers of the user equipment) that is more efficient, at least in the case of when the network and/or user equipment are in the geographical region associated with regulations limiting user equipment transmission power to the lower maximum transmission power, then only using a transmission configuration of its highest available power class (e.g., the higher power class).

Figure 1:
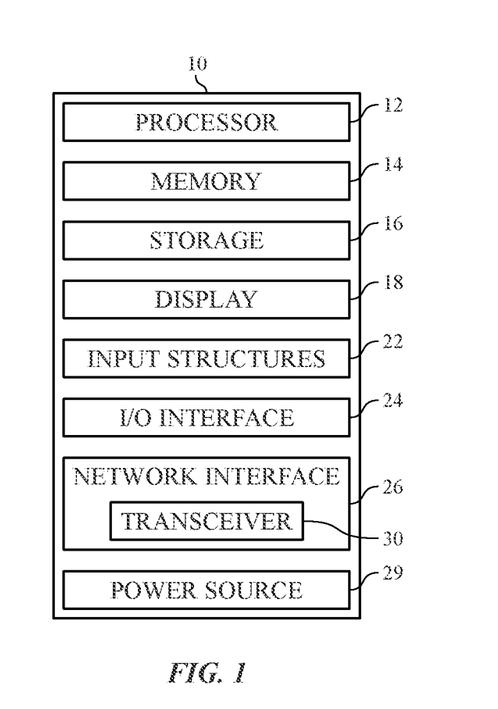
FIG. 1 is a block diagram of user equipment, according to embodiments of the present disclosure.

FIG. 1 is a block diagram of user equipment 10 (e.g., an electronic device, such as a mobile wireless communication device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable communication and/or computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable the user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
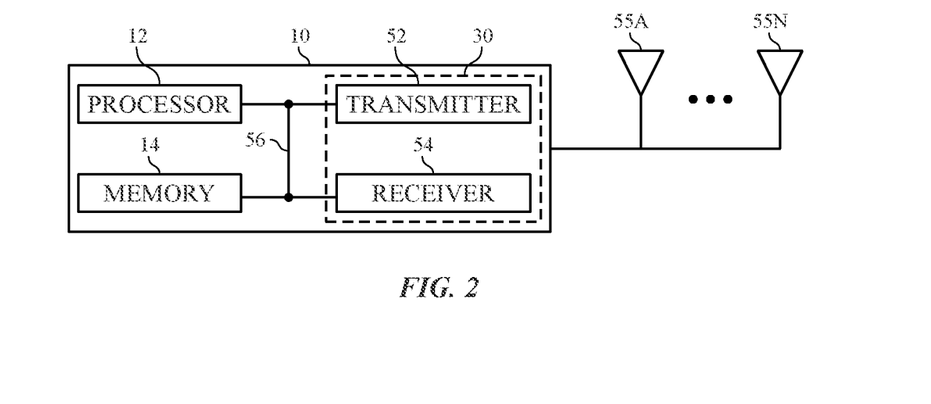
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
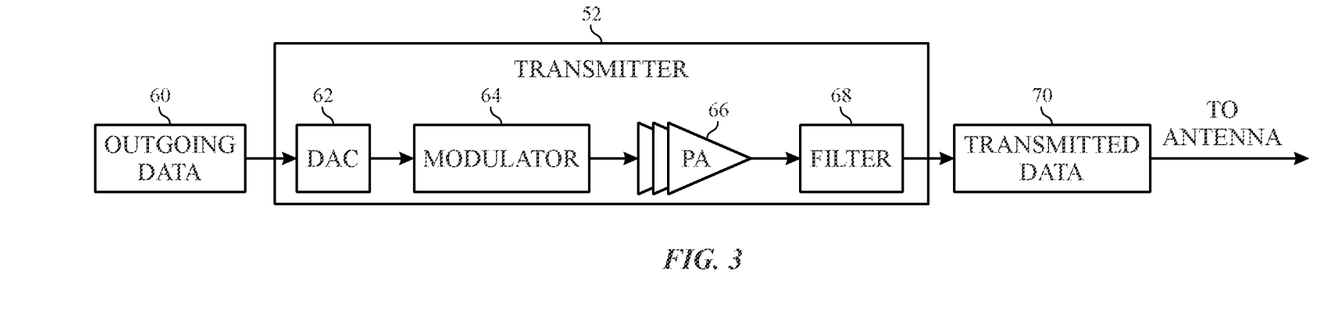
FIG. 3 is a schematic diagram of a transmitter of the user equipment of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. One or more power amplifiers (PAs) 66 receives the modulated signal from the modulator 64. While multiple power amplifiers 66 are shown, it should be understood that the transmitter 52 may include any suitable number (e.g., one or more, two or more, three or more, five or more, eight or more, ten or more, and so on) of power amplifiers 66. The power amplifiers 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
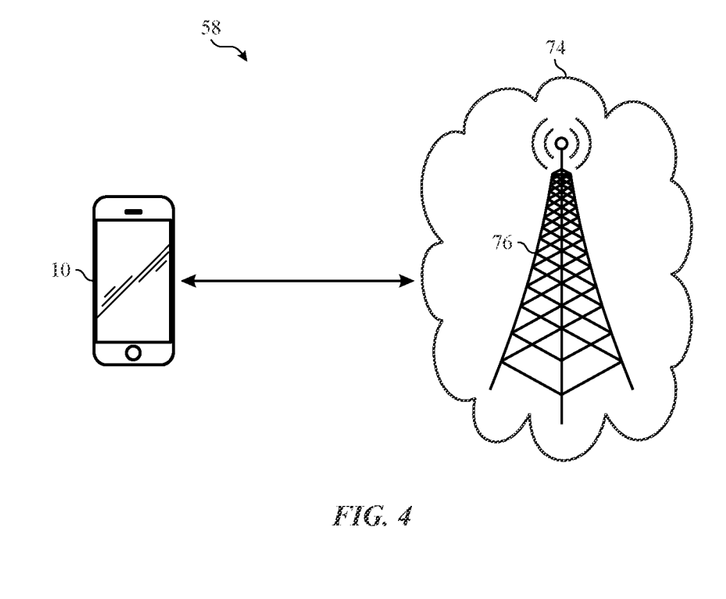
FIG. 4 is a schematic diagram of a communication system including the user equipment of FIG. 1 communicating with a communication network via a base station, according to embodiments of the present disclosure.

FIG. 4 is a schematic diagram of a communication system 58 including the user equipment 10 communicating with a communication network 74 via a base station 76, according to embodiments of the present disclosure. The network 74 may include any suitable communication network, such as a cellular network (e.g., a 3G cellular network, a 4G/LTE cellular network, a 5G/NR cellular network, or the like). Similarly, the base station 76 may include any suitable electronic device, such as a communication hub or node that facilitates, supports, and/or implements the network 74, including a NodeB, an eNodeB, gNodeB, or the like. The network 74 and/or the base station 76 may include some or all of the components of the user equipment 10 shown in FIGS. 1 and 2 (e.g., including the processor 12, the memory 14, the storage device 16, the transceiver 30, the transmitter 52, the receiver 54, and so on).

Regulatory bodies (e.g., the Federal Communications Commission (FCC) in the United States) may limit transmission power of the transmitter 52 of the user equipment 10 based on a frequency at which the transmitter 52 sends wireless signals (e.g., via the antenna(s) 55). For example, the FCC may limit the user equipment 10 operating within a specified frequency to a transmission power (referred as a maximum transmission power) of 23 decibel milliwatts (dBm). In other countries and frequency bands, the maximum transmission power limit may be up 26-29 dBm for licensed frequency bands. In many cases, unlicensed bands may have lower maximum transmission power limits.

In the case of the unlicensed bands, such as the 6 gigahertz (GHz) frequency band (e.g., between 5.925 GHz and 7.125 GHz), regulations may define several maximum Effective Isotropic Radiated Power (EIRP) levels. For example, a maximum transmission power of 23 dBm and higher may be used together with frequency coordination mechanisms (e.g. in the United States and Canada). In many countries, a maximum transmission power of 20-23 dBm may be used for indoor usage, and a maximum transmission power of 14-17 dBm and indoor and outdoor usage.

To ensure that user equipment 10 may be robust for multiple geographical region use, manufacturers may produce user equipment 10 that support as many regulations for a particular frequency band as possible. In particular, different user equipment 10 may support different maximum transmission power levels, based on hardware capability (e.g., numbers and/or types of power amplifiers 66) of the user equipment 10. That is, depending on user equipment implementation, one user equipment 10 may support a particular maximum transmission power differently compared to another user equipment 10.

Figure 5:
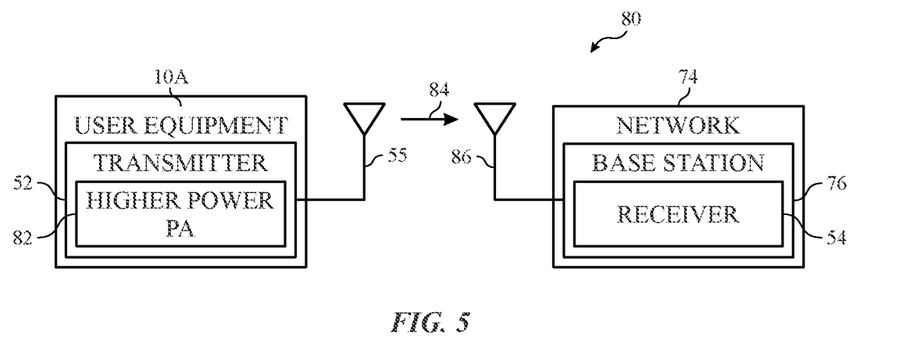
FIG. 5 is a schematic diagram of a communication system including user equipment of FIG. 1 having a higher power amplifier (PA) communicating with the communication network of FIG. 3, according to embodiments of the present disclosure.

FIG. 5 is a schematic diagram of a communication system 80 including user equipment 10A having a higher power amplifier (PA) 82 communicating with the communication network 74, according to embodiments of the present disclosure. In particular, the user equipment 10A may include the transmitter 52 having the higher power PA 82 (which may be representative of the PA 66 shown in FIG. 2). The higher power PA 82 may amplify a modulated signal to a suitable level to drive transmission of the signal 84 via the one or more antennas 55. The signal 84 (e.g., a radio frequency signal) may be received by one or more antennas 86 of the base station 76 supporting the network 74, which may be received at the receiver 54 of the base station 76.

The higher power PA 82 may correspond to providing a higher maximum transmission power (e.g., as dictated by a regulatory body of a geographical region) as compared to lower maximum transmission powers (e.g., as dictated by other regulatory bodies of other geographical regions, or for other usage, such as low-power indoor usage compared to standard power, or very low power usage compared to low-power indoor usage).

For example, the higher power PA 82 may provide a maximum transmission power of 36 dBm (e.g., the maximum transmission power dictated by the regulatory body in Canada for standard power in the unlicensed 6 GHz frequency band), 30 dBm (e.g., the maximum transmission power dictated by the FCC in the United States for standard power in the unlicensed 6 GHz frequency band), 24 dBm (e.g., the maximum transmission power dictated by the regulatory bodies in South Korea and Brazil for low-power indoor usage in the unlicensed 6 GHz frequency band), or the like. While the higher power PA 82 may also support a lower transmission power (e.g., lower than its maximum transmission power), it may do so with lower transmission power efficiency. For example, assuming the higher power PA 82 has a maximum transmission power of 23 dBm, and moves to a geographical region that has a maximum transmission power dictated by a regulatory body as 20 dBm, the higher power PA 82 may decrease power to operate using the maximum transmission power of 20 dBm, but may do so with a decrease in operating efficiency (e.g., when compared to a lower power PA that has a maximum transmission power of 20 dBm).

As such, the lower maximum transmission power may be lower than a threshold maximum transmission power, the higher maximum transmission power may be greater than or equal to the threshold maximum transmission power. The threshold maximum transmission power may be any suitable maximum transmission power that distinguishes the lower maximum transmission power from the higher maximum transmission power (e.g., 17 dBm or less, 18 dBm, 19 dBm, 20 dBm, 21 dBm, 22 dBm, 23 dBm or greater, 30 dBm, and so on). Thus, if a particular frequency band has several different maximum power restrictions (e.g., as applicable in different geographical regions), implementing multiple lower power amplifiers 66 in user equipment 10 may be beneficial.

Figure 6:
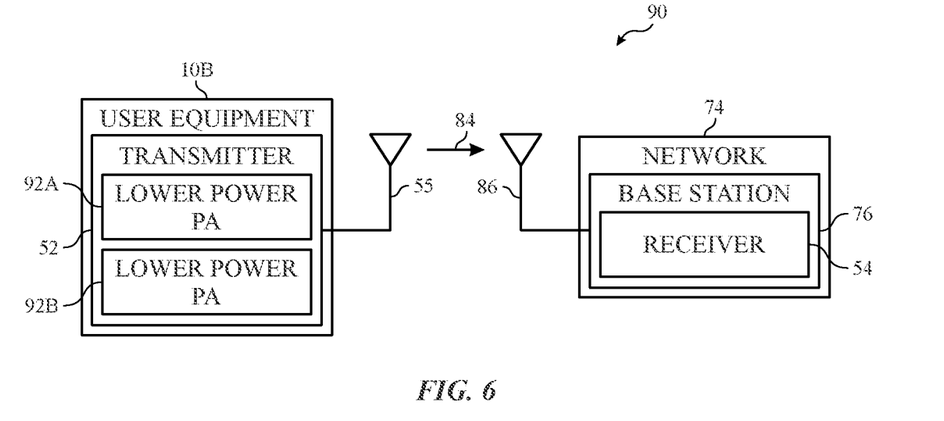
FIG. 6 is a schematic diagram of a communication system including the user equipment of FIG. 1 having multiple lower power PAs communicating with the communication network of FIG. 3, according to embodiments of the present disclosure.

FIG. 6 is a schematic diagram of a communication system 90 including the user equipment 10B having multiple lower power PAs 92A, 92B (collectively 92) communicating with the communication network 74, according to embodiments of the present disclosure. In particular, the user equipment 10B may include the transmitter 52 having the lower power PAs 92 (which may be representative of the PA 66 shown in FIG. 2). The lower power PAs 92 may amplify a modulated signal to a suitable level to drive transmission of the signal 84 via the one or more antennas 55. The signal 84 (e.g., a radio frequency signal) may be received by one or more antennas 86 of the base station 76 supporting the network 74, which may be received at the receiver 54 of the base station 76.

Each lower power PA 92 may correspond to providing a lower maximum transmission power (e.g., as dictated by a regulatory body of a geographical region) as compared to higher maximum transmission powers (e.g., as dictated by other regulatory bodies of other geographical regions, or for other usage, such as standard power compared to low-power indoor usage, or low-power indoor usage compared to very low power usage). For example, each lower power PA 92 may provide a maximum transmission power of 30 dBm (e.g., the maximum transmission power dictated by the FCC in the United States for standard power or by the regulatory body in Canada for low-power indoor usage in the unlicensed 6 GHz frequency band), 24 dBm (e.g., the maximum transmission power dictated by the FCC in the United States for low-power indoor usage or by the regulatory bodies in South Korea and Brazil for low-power indoor usage in the unlicensed 6 GHz frequency band), 14 dBm (e.g., the maximum transmission power dictated by the regulatory bodies in Canada and South Korea for very low power usage in the unlicensed 6 GHz frequency band), or the like.

Additionally, the lower power PAs 92 may combine to output a greater maximum transmission power than that which may be output by each lower power PA 92. For example, each lower power PA 92, when activated, may output a maximum transmission power of 20 dBm, but, together, the two illustrated lower power PAs 92, when activated, may combine to output a maximum transmission power of 23 dBm. It should be understood that, even though only two lower power PAs 92 are illustrated in FIG. 6, more may be contemplated (e.g., three or more, four or more, five or more, eight or more, ten or more, and so on).

As an example, the 6 GHz unlicensed frequency band has several maximum transmission power levels depending on the geographical region that the user equipment 10 and/or the network 74 is located, such as 20 dBm and 23 dBm. User equipment 10 may find it more beneficial to support the 23 dBm maximum transmission power level using two 20 dBm power amplifiers 66 as, when the user equipment 10 enters a country or region that regulates maximum transmission power to 20 dBm, the user equipment 10 may use a single 20 dBm power amplifier 66. This is because the single 20 dBm power amplifier 66 may more efficiently provide transmission power of 20 dBm when compared to a 23 dBm power amplifier 66 providing the transmission power of 20 dBm. In the case where the user equipment 10 enters a country or region that regulates maximum transmission power to 23 dBm, the user equipment 10 may activate both the 20 dBm power amplifiers 66.

In particular, comparing the user equipment 10A of the communication system 80 of FIG. 5 to the user equipment 10B of the communication system 90 of FIG. 6, the user equipment 10A may support a higher maximum transmission power (e.g., of 23 dBm) using the higher power PA 82 (e.g., a single higher power PA 82), while the user equipment 10B may support the same higher maximum transmission power using the multiple (e.g., two) lower power PAs 92. If the user equipment 10A, 10B were to move to a geographical region with a regulatory body that enforces a lower maximum transmission power (e.g., of 20 dBm), the user equipment 10A may support the lower maximum transmission power using the higher power PA 82 (e.g., a single higher power PA 82), while the user equipment 10B may support the same lower maximum transmission power of 20 dBm using one of the multiple (e.g., two) lower power PAs 92. The user equipment 10B having the multiple lower power PAs 92 may operate more efficiently in the geographical region with the lower maximum transmission power than the user equipment 10A with the higher power PA 82, and thus may operate more efficiently overall.

User equipment 10 may indicate a power class to the network 74 corresponding to its maximum transmission power. For example, for 5G/NR, the 3GPP specification enables the user equipment 10 to indicate in a "ue-Power-Class" field a power class of "PC1," "PC2," "PC3," "PC4," "PC5," and so on, where each power class corresponds to a different maximum transmission power of the user equipment 10. The network 74 may then configure transmission power characteristic (e.g., a power reduction of the transmission power) of the user equipment 10 based on the power class. For example, the network 74 may indicate regional emission limits (e.g., from user equipment 10 transmission) in a network signaling (NS) flag to the user equipment 10, which may include or indicate an additional maximum power reduction (A-MPR) allowance that may be based on the power class. In particular, each power class may be associated with a different power back-off value (e.g., A-MPR allowance).

However, the user equipment 10 may only indicate one power class to the network 74. As such, the user equipment 10 may indicate its higher power class (e.g., associated with its higher transmission power). For example, if the user equipment 10, such as the user equipment 10B of FIG. 6, supports both a lower power class (e.g., PC5 having a lower maximum transmission power of 20 dBm when using one lower power PA 92) and a higher power class (e.g., PC3 having a higher maximum transmission power of 23 dBm when using two lower power PAs 92), the user equipment 10 may only indicate to the network 74 that is supports PC3. In cases where the user equipment 10 is operating in a geographical region where a regulatory body requires the user equipment 10 to operate using the lower maximum transmission power (e.g., that supported by both the lower and higher power classes), the network 74 configures the user equipment 10 with the lower maximum transmission power by indicating the regional emission limits in the network signaling (NS) flag to the user equipment 10 (e.g., received by the receiver 54 of the user equipment 10). However, the network 74 may only assume that the user equipment 10 is operating using the higher power class (e.g., PC3), as that was what was indicated by the user equipment 10, even though the user equipment 10 may use its lower power class (e.g., PC5). That is, the network 74 may have no indication that the user equipment 10 is operating at the lower power class, as the only signaling provide by the user equipment 10 was that it was capable of operating at the higher power class. As such, the network 74 may configure the user equipment 10 based on the higher power class rather than the lower power class (e.g., to operate using the A-MPR associated with higher power class rather than the A-MPR associated with the lower power class), which may result in operating and transmission inefficiencies.

For example, for the user equipment 10A of FIG. 5 that only supports the higher power class (e.g., PC3), when the maximum transmission power is 23 dBm, the A-MPR or maximum power back-off may be 6 dB. That is, the user equipment 10A may reduce its power up to 6 dB when backing off transmission power, resulting in up to 17 dBm transmission power after power back-off. Even if the network 74 configures the maximum transmission power to the lower maximum transmission power of 20 dBm, the user equipment 10A nevertheless may back-off up to 6 dB to 17 dBm. Accordingly, irrespective of the fact whether the user equipment 10A is configured with either 20 dBm or 23 dBm, the network 74 (e.g., a scheduler of the network 74) may configure or schedule the user equipment 10A based on the possibility of the user equipment 10A decreasing its transmission power down to 17 dBm.

However, for the user equipment 10B of FIG. 6 that supports both the higher power class (e.g., PC3) and the lower power class (e.g., PC5), the A-MPR or maximum power back-off for the lower power class may be 2 dB. That is, the user equipment 10B may reduce its power up to 2 dB when backing off transmission power, resulting in up to 18 dBm transmission power after power back-off. As such, if the network 74 configures the maximum transmission power to the lower maximum transmission power of 20 dBm, the user equipment 10B may use the lower power class and back-off up to 2 dB from 20 dBm to 18 dBm. However, the network 74 may only be aware that the user equipment 10B supports the higher power class, and configure or schedule the user equipment 10B based on the possibility of the user equipment 10B decreasing its transmission power down to 17 dBm, instead of 18 dBm as the user equipment 10B is operating in the lower power class. This may result in operating and transmission inefficiencies of the user equipment 10B.

Embodiments herein provide the ability for the user equipment 10 (including 10A of FIG. 5 and 10B of FIG. 6) to indicate multiple power classes (e.g., beyond merely a single power class) that the user equipment 10 may support to the network 74. In particular, the user equipment 10B of FIG. 6 may send indications to the network 74 that it supports both the lower power class (e.g., when operating one lower power PA 92) and the higher power class (e.g., when operating two lower powers PA 92) for, for example, a certain frequency band (e.g., the 6 GHz unlicensed band). Indicating the lower power class, as well as the higher power class, may imply that the user equipment 10 may operate according to the lower power class, and use corresponding transmission power characteristics (e.g., A-MPR values) if the network 74 configures the user equipment 10 with the corresponding (e.g., the lower) maximum transmission power.

Accordingly, the network 74 may receive a list or indication of multiple power classes (e.g., a higher power class and a lower power class), instead of a single power class, that is supported by the user equipment 10. When configuring the user equipment 10 for a lower maximum transmission power, the network 74 may accurately determine or assume that the user equipment 10 may operate according to the corresponding lower power class. The network 74 may then use this information to more efficiently or optimally configure (e.g., schedule or allocate resources to) the user equipment 10, particularly when compared to if the network 74 were to assume that the user equipment 10 was only capable of operating at the higher power class.

Figure 7:
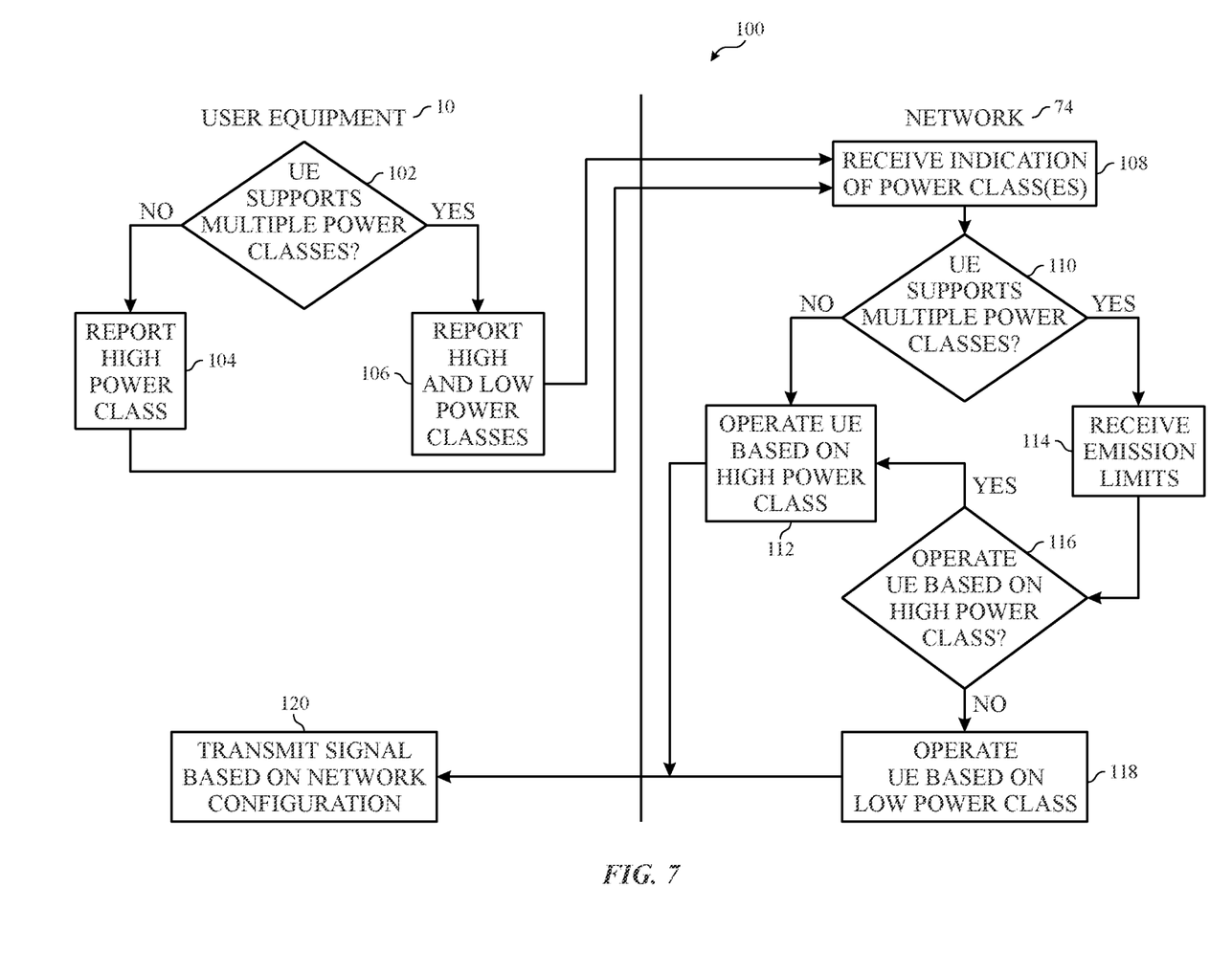
FIG. 7 is a flowchart of a method for efficient transmission using indications of multiple power classes, according to embodiments of the present disclosure.

FIG. 7 is a flowchart of a method 100 for efficient transmission using indications of multiple power classes, according to embodiments of the present disclosure. Any suitable device (e.g., a controller) that may control components of the user equipment 10, the network 74, and/or the base station 76, such as the processor 12, may perform the method 100. In some embodiments, the method 100 may be implemented by executing instructions stored in a tangible, non-transitory, computer-readable medium, such as the memory 14 or storage 16, using the processor 12. For example, the method 100 may be performed at least in part by one or more software components, such as an operating system of the user equipment 10, the network 74, and/or the base station 76, one or more software applications of the user equipment 10, the network 74, and/or the base station 76, and the like. While the method 100 is described using steps in a specific sequence, it should be understood that the present disclosure contemplates that the described steps may be performed in different sequences than the sequence illustrated, and certain described steps may be skipped or not performed altogether.

In decision block 102, the user equipment 10 determines whether it supports multiple power classes. For example, the user equipment 10A of FIG. 5 may determine it does not, as it may only support a higher power class (e.g., PC3 having a higher maximum transmission power of 23 dBm using the higher power PA 82), since it only has the higher power PA 82. Such may be the case with older or legacy user equipment 10, as opposed to newer user equipment 10 that may support multiple power classes. It should be understood that supporting a lower power class is not the same as supporting a lower maximum transmission power. That is, while the higher power PA 82 may support a lower maximum transmission power, it may do so inefficiently. Moreover, even though the higher power PA 82 may support the lower maximum transmission power, the user equipment 10A having the higher power PA 82 may not said to support the lower power class. Instead, due to it higher maximum transmission power, the user equipment 10A having the higher power PA 82 may be said to support the higher power class, but not the lower power class.

If the user equipment 10 determines that it does not support multiple power classes, then, in process 104, the user equipment 10 reports its supported power class (e.g., the higher power class). In particular, the user equipment 10 (e.g., the user equipment 10A) may send an indication of only the higher power class (e.g., PC3 having a higher maximum transmission power of 23 dBm using the higher power PA 82) to the network 74. If the user equipment 10 determines that it does support multiple power classes, then, in process 106, the user equipment 10 reports its supported power classes (e.g., the higher power class and the lower power class). In particular, the user equipment 10 (e.g., the user equipment 10B of FIG. 6) may send an indication of the higher power class and the lower power class (e.g., PC3 having a higher maximum transmission power of 23 dBm using both lower power PAs 92, and PC5 having a lower maximum transmission power of 20 dBm using one lower power PA 92) to the network 74. It should be understood that, in other embodiments, the user equipment 10 may support more than two power classes, and, thus, the user equipment 10 may send an indication of more than two power classes (e.g., one for each power class it supports) to the network 74.

In process block 108, the network 74 receives an indication of the power class(es). In particular, the network 74 may receive the indication via a receiver 54 of a base station 76 supporting the network 74. For example, the network 74 may receive the indication of only the higher power class from the user equipment 10A of FIG. 5, or multiple power classes (e.g., the higher power class and the lower power class) from the user equipment 10B of FIG. 6. In decision block 110, the network 74 determines whether the user equipment 10 supports multiple power classes. In particular, the network 74 may determine whether the user equipment 10 supports multiple power classes based on the indication of the power class(es) received from the user equipment 10 in process block 108.

If the network 74 determines that the user equipment 10 does not support multiple power classes, then, in process block 112, the network 74 operates or configures the user equipment 10 to operate based on the higher power class. In particular, the network 74 does not receive an indication, and thus may be unaware, that the user equipment 10 supports a lower power class. If the network 74 configures the user equipment 10 with the lower maximum transmission power (e.g., through configuring a maximum transmission power (Pmax) of the transmitter 52 of the user equipment 10 and/or via sending a network signaling (NS) value to the user equipment 10), then the network 74 may only assume that the user equipment 10 transmits signals using the higher power PA 82, and that the user equipment 10 may use transmission power characteristics (e.g., A-MPR values) corresponding to the higher power class.

If the network 74 determines that the user equipment 10 does support multiple power classes, then, in process block 114, the network 74 receives emission limits for, for example, a geographical region that the user equipment 10, the base station 76 supporting the network 74, and/or the network 74 are located, and a specified frequency (e.g., on which the network 74 determines that the user equipment 10 is to transmit signals). The emission limits may refer to limits on radio frequency energy emitted when the user equipment 10 transmits radio frequency signals, which may differ from geographical region to geographical region, and depend on a frequency of the radio frequency signals. For example, the FCC may limit user equipment 10 operating within a specified frequency to a transmission power (referred as a maximum transmission power) of 23 dBm. The network 74 may subsequently send the emission limits to the user equipment 10 and/or configure the user equipment 10 based on the emission limits (e.g., such that transmission of signals from the user equipment 10 does not exceed the emission limits). In some embodiments, the network 74 may receive an indication of the geographical region that the user equipment 10, the base station 76, and/or the network 74 are located, and an indication of the specified frequency on which the user equipment 10 is to transmit signals. The network 74 may then determine the emission limit or limits based on or corresponding to the geographical region and/or the specified frequency. Moreover, the network 74 may send a configuration for the user equipment 10 to implement to ensure that signal transmission does not exceed the emission limits.

In process block 116, the network 74 determines whether to operate the user equipment 10 based on the higher power class. In particular, the network 74 may determine whether the higher power class meets the emission limits for the region and specified frequency received in process block 114 (e.g., such that the higher transmission power associated with the higher power class does not exceed the emission limits). If so, then, in process block 112, the network 74 operates or configures the user equipment 10 to operate based on the higher power class, as explained in further detail above. In particular, the network 74 may configure the user equipment 10 based on transmission power characteristics (e.g., A-MPR values) corresponding to the higher power class.

If the network 74 determines to operate the user equipment 10 based on the lower power class, then in process block 118, the network 74 operates or configures the user equipment 10 to operate based on the lower power class. In particular, the network 74 is aware that the user equipment 10 may operate using the lower power class, and, if the network 74 configures the user equipment 10 with the lower maximum transmission power (e.g., through configuring a maximum transmission power (Pmax) of the transmitter 52 of the user equipment 10 and/or via sending a network signaling (NS) value to the user equipment 10). That is, the network 74 may configure the user equipment 10 based on transmission power characteristics (e.g., A-MPR values) corresponding to the lower power class. In process block 120, the user equipment 10 may then transmit one or more radio frequency signals based on the network configuration (e.g., how the network 74 has configured the user equipment 10). In this manner, the transmitter 52 of the user equipment 10 may efficiently transmit signals compared to when the network 74 is unaware that the user equipment 10 supports both higher and lower power classes.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:
a transmitter comprising a plurality of power amplifiers, the transmitter configured to transmit an indication of a first power class and a second power class being supported by the plurality of power amplifiers, wherein the first power class is associated with operating the transmitter using a first maximum transmission power that is greater than a second maximum transmission power associated with the second power class; and
processing circuitry configured to
receive a first configuration associated with operating the transmitter using the first power class based on the indication and the first maximum transmission power not exceeding an emission limit,
receive a second configuration associated with operating the transmitter using the second power class based on the indication and the first maximum transmission power exceeding the emission limit,
adjust transmission power of the transmitter based on receiving the first configuration or the second configuration, and transmit, using the transmitter, a radio frequency signal using the transmission power.

2. The user equipment of claim 1, wherein the indication of the first power class and the second power class are associated with a frequency band.

3. The user equipment of claim 1, wherein the first power class is associated with a higher power class and the second power class is associated with a lower power class.

4. The user equipment of claim 3, wherein the plurality of power amplifiers is configured to support the lower power class when a lesser number of the plurality of power amplifiers is activated, and support the higher power class when a greater number of the plurality of power amplifiers is activated.

5. The user equipment of claim 1, wherein the first power class is associated with a first transmission power back-off and the second power class is associated with a second transmission power back-off different than the first transmission power back-off.

6. The user equipment of claim 1, wherein the processing circuitry is configured to configure the transmitter with the first power class based on receiving the first configuration and configured the transmitter with the second power class based on receiving the second configuration.

7. The user equipment of claim 1, comprising a receiver, the receiver configured to receive the first configuration, the second configuration, or both from a network.

8. The user equipment of claim 1, wherein the processing circuitry configured to
adjust the transmission power of the transmitter by operating in the first power class based on the first configuration; and
adjust the transmission power of the transmitter by operating in the second power class based on the second configuration.

9. The user equipment of claim 8, wherein the processing circuitry is configured to adjust the transmission power of the transmitter by
applying a first power back-off to the transmission power based on the first power class; and
applying a second power back-off different than the first power back-off to the transmission power based on the second power class.

10. A base station, comprising:
a receiver configured to receive a first indication of whether user equipment supports a first power class associated with a first maximum transmission power and supports a second power class associated with a second maximum transmission power less than the first maximum transmission power; and
processing circuitry configured to
schedule operation of the user equipment using the first power class based on the user equipment not supporting the first power class and the second power class,
receive a second indication of an emission limit based on the user equipment supporting the first power class and the second power class, and
schedule operation of the user equipment using the second power class based on the first maximum transmission power exceeding the emission limit.

11. The base station of claim 10, wherein the processing circuitry is configured to schedule operation of the user equipment using the first power class based on the first maximum transmission power meeting the emission limit.

12. The base station of claim 11, wherein the processing circuitry is configured to schedule operation of the user equipment using the first power class by sending a configuration indicating a maximum power reduction associated with the first power class.

13. The base station of claim 10, wherein the processing circuitry is configured to schedule operation of the user equipment using the second power class by sending a configuration indicating a maximum power reduction associated with the second power class.

14. The base station of claim 10, wherein the processing circuitry is configured to receive a third indication of a geographical region and determine the emission limit based on the geographical region.

15. The base station of claim 10, wherein the processing circuitry is configured to receive a third indication of a specified frequency on which the base station determines that the user equipment is to transmit a radio frequency signal, and determine the emission limit based on the specified frequency.

16. A method, comprising:
receiving, at a receiver of a base station, an indication of whether user equipment supports a higher power class and a lower power class;
operating, via processing circuitry of the base station, the user equipment using the higher power class based on the user equipment not supporting the higher power class and the lower power class;
receiving, at the processing circuitry, an additional indication of an emission limit for a geographical region at which the base station or the user equipment is located; and
operating, via the processing circuitry, the user equipment using the lower power class based on a maximum transmission power of the higher power class exceeding the emission limit.

17. The method of claim 16, wherein the maximum transmission power of the higher power class is a higher maximum transmission power than an additional maximum transmission power of the lower power class.

18. The method of claim 16, comprising operating, via the processing circuitry, the user equipment using the higher power class based on the higher-maximum transmission power not exceeding the emission limit.

19. The method of claim 16, comprising transmitting, via a transmitter of the base station, a configuration indicating a maximum power reduction associated with the higher power class based on operating the user equipment using the higher power class.

20. The method of claim 16, comprising transmitting, via a transmitter of the base station, a configuration indicating a maximum power reduction associated with the lower power class based on operating the user equipment using the lower power class.

* * * * *